Oct. 29, 1963 L. HACKLER 3,108,360

METHOD OF MAKING ELECTRICAL CIRCUITS

Filed June 15, 1961 3 Sheets-Sheet 1

INVENTOR

Ludwig Hackler by

Ooms, McDougall, Williams & Hersh atty.

INVENTOR
Ludwig Hackler
by.
Ooms, McDougall, Williams & Hersh
atty.

METHOD OF MAKING ELECTRICAL CIRCUITS

Filed June 15, 1961 3 Sheets-Sheet 3

INVENTOR
Ludwig Hackler by
Ooms, McDougall, Williams & Hersh
atty.

United States Patent Office 3,108,360
Patented Oct. 29, 1963

3,108,360

METHOD OF MAKING ELECTRICAL CIRCUITS

Ludwig Hackler, 17 Paul Hug Strasse, Wilhelmshaven, Germany

Filed June 15, 1961, Ser. No. 117,364
Claims priority, application Germany Oct. 8, 1960
2 Claims. (Cl. 29—155.5)

The invention relates to an arrangement for the connection of electric circuit elements, for example in electric business machines and the like.

In electric business machines, for example typewriters, it has hitherto been customary to connect the individual electric circuit elements together by cable systems. Such an arrangement has numerous disadvantages, however. Cable systems are expensive to manufacture and unsuitable for assembly-line production. In operation they are easily exposed to damage and their insulation may become chafed and wires break through vibration. Defective conductors can only be replaced with difficulty. In addition, devices such as electric typewriters need cleaning with solvents from time to time, before which the cable systems have to be dismounted, which is undesirable in order to avoid damage to the insulation.

Replacement of the cable systems by the known printed or etched circuits is also unsatisfactory, particularly when the circuit is exposed to vibration in operation, when heavy currents have to be carried or when the circuit elements to be connected lie in different planes as is generally the case. The printed or etched circuit backed in the conventional manner with sheets of insulating material tends to peel off under repeated mechanical shocks. Additionally there is a comparatively low limit to the maximum current permissible, at least in economical forms of construction, and a direct connection between circuit elements lying in different planes is generally impossible so that in such cases, additional conductors have to be introduced between the printed or etched circuit and the individual elements which do not lie in the plane of the circuit.

The invention overcomes these disadvantages by providing an arrangement for the connection of electric circuit elements, for example in electric business machines, which is characterised by a circuit which has angled terminal portions serving for the connection to the electric circuit elements, and which is cut out of sheet metal and mounted on a sheet of insulating material.

The sheet metal may easily be selected to be as thick as is required for the maximum current loading of the arrangement which will occur, while the loss of material occurring during the cutting out, for example, stamping out, can be kept to a minimum by suitable circuit arrangement. The terminal portions serving for the connection of the individual circuit elements may easily be sufficiently long so that circuit elements which are situated in different planes above or below the sheet of insulating material can be attached directly without additional intermediate connections being necessary. In comparison with round conductors, the resulting flat conductors have a better heat-transmission capacity and interference suppressors are only necessary to a small extent.

In an advantageous embodiment of the invention, the circuit may be arranged between two sheets of insulating material and the terminal portions may project through apertures in at least one of the sheets of insulating material. The "enclosed circuit" thus formed is largely insensitive to mechanical stressing.

The circuit may be fixed to the sheet of insulated material by means of rivets, pins or the like engaging through the circuit and a sheet of insulating material.

The circuit may further be conveniently stuck to at least one of the sheets of insulating material so that the individual conductors are immovably located.

It is also possible to provide circuits one above the other, each arranged between two sheets of insulating material, in a plurality of planes, for example crossing over one another, between which circuits, electric conductors extending from one conducting plane to another establish connections.

Superimposed circuits may be electrically connected in a simple manner by means of pins, rivets or the like, which engage through the circuits and the sheet or sheets of insulating material arranged between them. Such components further contribute to locating the circuit on the associated sheet of insulating material.

The "enclosed circuit" provided by the invention may be used as part of the housing of the associated equipment, for example as the base plate of an electric typewriter. In this case, the sheets of insulating material may be provided with recesses which permit access to circuit elements and the like situated behind the sheets of insulating material and/or the admission of cooling air, as a result of which servicing is facilitated and provision is made for favourable cooling conditions.

It is a great advantage, to produce the arrangement in such a manner that the circuit is cut out, for example stamped out of a length of sheet metal in straight cuts in the form of a coherent structure, that the terminal portions serving for the connection of the electrical circuit elements are bent out, the circuit arranged between the sheets of insulating material and only the connecting parts serving to hold the circuit together are removed.

A specific embodiment of the invention will now be described by way of example with reference to the accompanying drawings, in which.

Figure 1:
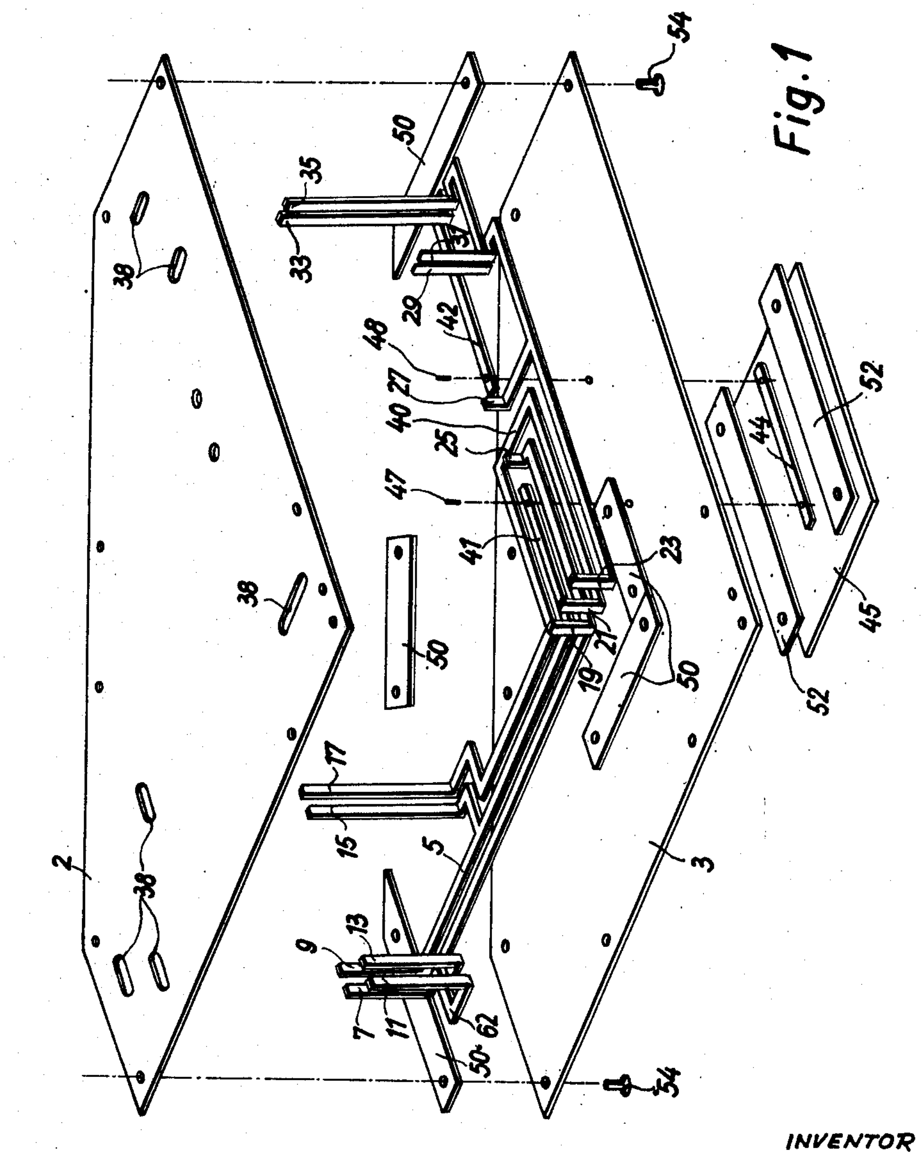
FIGURE 1 is an exploded view of an arrangement according to the invention, prior to assembly.

The arrangement shown in FIGURE 1 comprises two sheets of insulating material 2, 3. Between the sheets of insulating material the circuit 5 is interposed, parts of which are bent vertically upwards out of the plane thereof forming terminal portions 7 and 9 for connection to the mains 10 (see the circuit diagram in FIGURE 3), terminal portions 11, 13 for connection to a resistor 14, terminal portions 15, 17 for connection to a capacitor 18, terminal portions 19, 21, 23 for connection to a motor 24, terminal portions 25, 27 for connection to a transformer 28, terminal portions 29, 31 for connection to a switch 32 and terminal portions 33, 35 for connection to a further switch 36.

The upper sheet 2 of insulating material is provided with slots 38 through which can protrude the terminal portions provided for the connection of the circuit elements. Bridging of the conductor 40 and electrically connecting the conductors 41 and 42 leading to the terminal portion 9 and terminal portion 33 respectively, is a conducting member 44 arranged between the lower sheet 3 of insulating material and a cover plate 45 which likewise consists of insulating material. Metallic pins 47, 48, which extend through the ends of the conductors 41 and 42, through the sheet of insulating material 3 and the ends of the conductor 44, establish an electrical connection between the conductors 41, 42 and 44.

The sheets of insulating material 2 and 3 and the lower cover plate 45 are held together by means of rivets 54 with the interposition of spacers 50 and 52 respectively, the thickness of which is substantially equal to the thickness of the circuit 5.

Figures 2, 3:
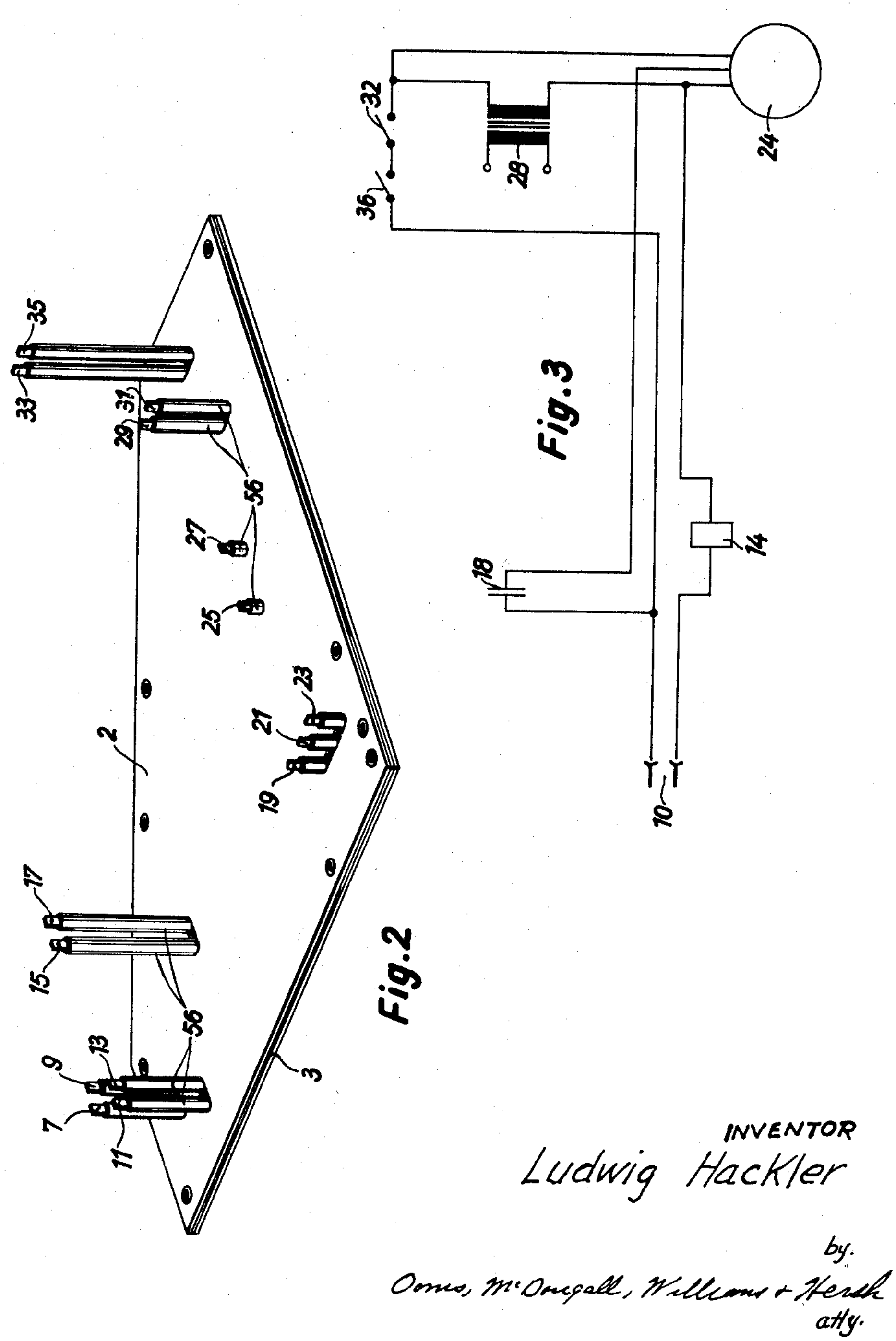
FIGURE 2 shows the arrangement of FIGURE 1, after assembly.
FIGURE 3 shows the circuit diagram of the arrangement shown in FIGURES 2 and 3.

FIGURE 2 shows the finished arrangement in which insulating sleeves 56 are slid over the terminal portions which project upwards through the sheet of insulating material 2, and leave free ends of the terminal portions suitable for the connection of the electric circuit elements, for example by means of clip, screw or soldered connections.

It is understood that the special construction of the arrangement is open to numerous modifications. Whereas in the example illustraed, all the terminal portions serving for the connection of the circuit elements project upwards through the sheet of insulating material 2, circuit elements may be provided in various planes on both sides of the arrangement and corresponding terminal portions may extend downwards through the sheet 3 of insulating material. Other more complicated circuits, for example overlapping the circuit 5, may be provided in a similar manner to the conducting member 44 above or below the circuit 5, between the sheet of insulating material 2 and the sheet of insulating material 3 respectively and further corresponding sheets of insulating material.

The production of the arrangement shown in FIGURES 1 and 2 may, to advantage, be effected as follows.

Figure 4:
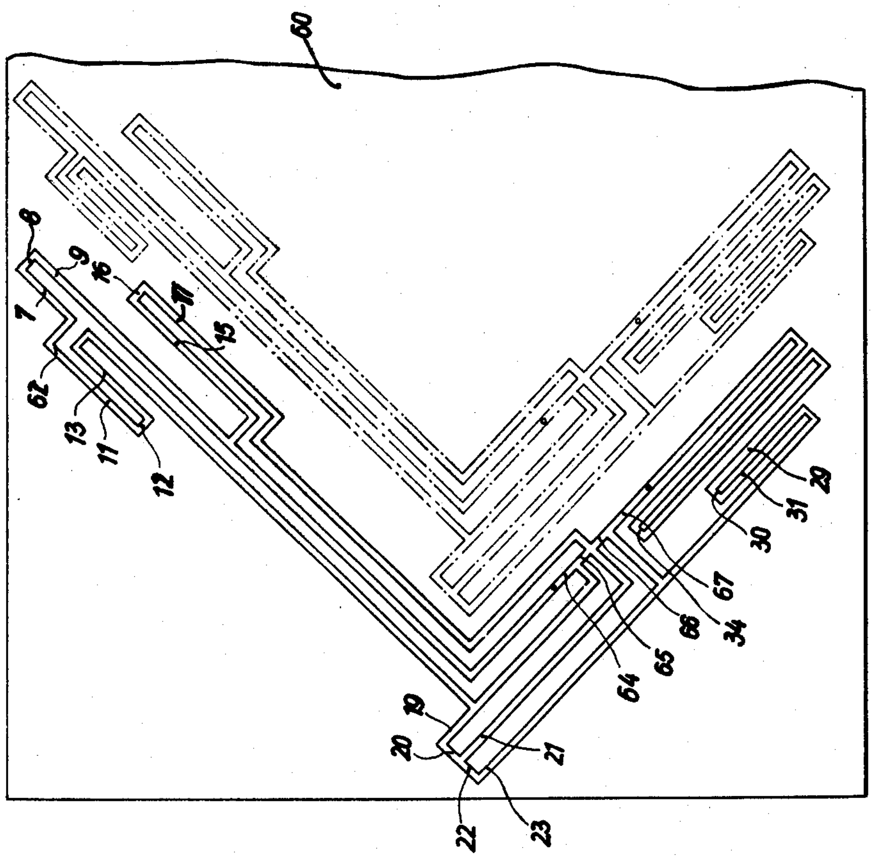
FIGURE 4 shows a length of sheet metal with the circircuit to be cut therefrom.

As shown in FIGURE 4, the circuit 5 is stamped out of a length of sheet metal 60 in straight cuts in the form of a coherent structure, that is to say care is taken to ensure that the conductors which are later separated are at first joined together through bridges which are only removed in the course of further manufacture. Such a procedure considerably facilitates production because the circuit can be produced, transported, stored and processed as a uniform whole and the handling of a multiplicity of individual conductors is unnecessary.

For example, the conductor 62, which is separated in the finished arrangement, is at first connected by its terminal portions 7 and 11, by means of bridges 8 and 12, to the terminal portions 9 and 13 respectively of adjacent conductors. In a similar manner, bridges 16, 20, 22, 30 and 34 hold the terminal portions 15 and 17, 19, 21 and 23, 29 and 31, and 33 and 35 together.

Additional bridges 64, 65, 66 and 67 form mechanical connections between the conductor 41 and the terminal portion 25, between the terminal portion 25 and the conductor 40, between the conductor 40 and the terminal 27 and between the terminal portion 27 and the conductor 42.

In order to facilitate the removal of the bridges before the arrangement is finished, grooves, which are not illustrated, may be impressed at the points of future separation during the stamping operation.

FIGURE 4 shows, on the left, a circuit which has already been stamped out and on the right of it, in broken lines, a circuit which is to be stamped out of the strip 60 in the subsequent stamping operation.

In the same operation as the stamping operation or in a following operation, the terminal portions 7, 9, 11, 13, 15, 17, 19, 21, 23, 29, 31, 33 and 35 together with the bridges 8, 12, 16, 20, 22, 30, and 34 connecting them, are bent at right angles out of the plane of the circuit.

The circuit thus prepared is then placed on the sheet of insulating material 3 to which a pattern of adhesive corresponding to the finished circuit 5 has first been applied. After the setting of the adhesive, the bridges 64, 65, 66 and 67 are cut out, pins 47, 48 passed through the ends of the conductors 41, 42, through the sheet of insulating material 3 and the ends of the conductor 44 arranged below, and riveted and the terminal portions 25, 27 are bent out, for example in one operation.

The sheet of insulating material 2 which is provided with the slots 38, and the cover plate 45 are then placed in position with the interpostion of the spacers 50, 52 and are riveted to the sheet of insulating material 3. Finally, the connecting portions 8, 12, 16, 22, 30 and 34 may be removed and the insulating sleeves 56 placed in position.

Instead of applying a pattern of adhesive corresponding to the finished circuit 5, to the sheet of insulating material 3, the circuit may conveniently be fixed, to the sheet 3, which is not provided with adhesive, by means of rivets, pins or the like which engage through the sheet 3 and the circuit 5. Then, after the bridges 64, 65, 66 and 67 have been removed, the pins 47, 48 taken through the conductors 41, 42, the sheet of insulating material 3 and the conductor 44, and riveted, and the terminal portions 25, 27 bent out, the sheet of insulating material 2 can be stuck to the sheet of insulating material 3 and the circuit 5.

I claim:

1. In a method of making electrical circuits, the procedure comprising cutting out a plurality of interconnected conducting strips from a length of sheet metal while forming terminal portions on said conductive strips connected together by connecting portions to hold the conducting strips together in a coherent structure, bending out the terminal portions from the plane of said conducting strips, mounting said conducting strips on a sheet of insulating material, and removing the connecting portions from the terminal portions.

2. In a method of making electrical circuits, the procedure of cutting a length of sheet metal to form a coherent circuit structure having a plurality of conductors with a plurality of terminal portions joined by connecting portions to hold the structure together, binding the terminal portions into angular relation to the conductors, mounting the conductors between sheets of insulating material, and severing the connecting portions from said terminal portions.

References Cited in the file of this patent

UNITED STATES PATENTS

| | | |
|---|---|---|
| 2,066,876 | Carpenter et al. | Jan. 5, 1937 |
| 2,492,235 | Mitchell | Dec. 27, 1949 |